(12) United States Patent
Hanko et al.

(10) Patent No.: US 6,639,604 B1
(45) Date of Patent: Oct. 28, 2003

(54) METHOD AND APPARATUS FOR COLORMAPPING

(75) Inventors: James G. Hanko, Redwood City, CA (US); J. Duane Northcutt, Menlo Park, CA (US); Gerard A. Wall, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/289,800

(22) Filed: Apr. 9, 1999

(51) Int. Cl.[7] .................................................. G09G 5/02
(52) U.S. Cl. ...................... 345/589; 345/602; 345/536; 345/537; 345/541
(58) Field of Search ................................ 345/589, 602, 345/536, 537, 541

(56) References Cited

U.S. PATENT DOCUMENTS 5,025,249 A * 6/1991 Seiler et al. ................ 345/589
5,442,749 A    8/1995 Northcutt et al.
5,977,991 A * 11/1999 DeGoricija et al. ......... 345/536

* cited by examiner

*Primary Examiner*—Jeffery Brier
*Assistant Examiner*—Faranak Fouladi
(74) *Attorney, Agent, or Firm*—O'Melveny & Myers LLP

(57) ABSTRACT

A method for displaying color values in a plurality of images on a display screen in a computer graphics system, wherein the images correspond to a plurality of applications. The graphics system includes a primary frame buffer for pixel values to be displayed in the images, and a plurality of colormap tables related to the images for providing color values to be displayed in the images. A pseudo frame buffer is provided for the applications to store source pixel values for display in the corresponding images. To display the source pixel values in the pseudo frame buffer, for each source pixel the graphics system performs the steps of: identifying the image corresponding to the source pixel value; selecting a colormap table corresponding to the identified image; using the source pixel value as an index to select a color value from the selected colormap table; and storing the selected color value as a pixel value in the primary frame buffer to be displayed. The primary frame buffer may be a pseudo frame buffer implemented in software for providing source data to an HID display through an interconnect.

34 Claims, 8 Drawing Sheets

METHOD AND APPARATUS FOR COLORMAPPING

BACKGROUND OF THE INVENTION

1. Field of the Invention

This invention is in the field of displaying colors on computer systems, and in particular to colormapping in windowing computer systems.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun Microsystems, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

2. Background

Many computer systems have a color display for displaying color images and data. Some applications display color images that are limited to 256 different colors. This is accomplished by having a "colormap" that includes the description of 256 different colors and indexes to each color description. Each pixel to be displayed on the display has an associated index value. The index is used to find the color of the pixel by looking it up in the colormap.

A problem with this system occurs when more than one image or window are displayed on the display. Each image or window may have its own associated colormap, and only a limited number of colormaps are available at any one time. If the number of color maps is "n" color maps, but there are n+1 images requiring n+1 colormaps, a problem arises. For purposes of this discussion, consider the situation where there are two images requiring two colormaps, but only one colormap can be available at one time. Typically, it is the colormap of the "topmost" image or window that is used as the colormap for both images on the display. Thus, the topmost image will have correct colors, but the other image will look incorrect, because it is using an incorrect colormap. This improper mapping of the color of an image to an incorrect color map is known as colormap "flash". Each time the other image or window is made the topmost window, its colormap is made the colormap for the entire display. The previous topmost image that previously looked correct now looks incorrect because it is displayed with an incorrect colormap. The problems associated with colormaps can be understood by reviewing current colormap techniques.

Colormaps

The colormap is an indexed look-up table comprising rows of color cells and columns corresponding to fields within each cell, wherein each color cell represents a unique color for the colormap. Each cell contains digital color values representing a particular color such as red, green and blue, and generally, the number of cells in a colormap represents the number of individual colors provided by the colormap.

Typically only one colormap is utilized by the computer system hardware, and each application running in a window requests a different colormap to be loaded into the computer's colormap hardware for use. Thereafter, the colors displayed on the display screen are defined by the loaded colormap. One way for a window to have its colormap loaded is when the window is on top or is in the foreground in the windowing system and receives all user input. Where the number of colormaps requested by one or more other windows for display exceeds the number of colormaps which the underlying hardware can support, these other windows flash with incorrect colors. For example, where the hardware supports one 256 entry colormap then at most 256 unique colors can be displayed at a time. Another window whose colormap is not loaded displays unexpected colors. Further, if an application writes data to a window with a different colormap than that loaded in the hardware, then certain area within the screen appear to suddenly flash to different colors. When the colormaps between two windows differ significantly, then flashing is very prominent.

Further, many older applications were written using 8-bit color-mapped graphics wherein each pixel in a display frame buffer has a corresponding index to a colormap table. However, modern graphics systems often provide only 24-bit, or higher, true-color graphics support and cannot normally support the old 8-bit color-mapped applications. The problem is to support such programs with reasonable performance without 8-bit colormap hardware.

There is therefore a need for a method of colormapping in a windowing graphics system which eliminates colormap flash. There is also a need for such a method to support 8-bit color color-mapped applications in 24-bit graphics systems without use of 8-bit colormap hardware and with minimal performance loss.

SUMMARY OF THE INVENTION

The present invention provides a method of displaying color values in a plurality of images or windows on a display in a computer graphics system. The graphics system comprises a primary frame buffer for pixel values to be displayed in said windows, and a plurality of colormap tables corresponding to the windows for providing color values to be displayed in the windows. The method comprises the steps of: providing a frame buffer in software (in one embodiment a pseudo frame buffer) to store source pixel values for display in the windows, wherein each source pixel value selects a color value within a colormap table; and for each source pixel value in the pseudo frame buffer, performing steps including: (1) identifying the corresponding image, (2) selecting a colormap table corresponding to the identified image, (3) using the source pixel value to select a color value from the selected colormap table, and (4) storing the selected color value as a pixel value in the primary frame buffer to be displayed.

In another embodiment, the method of the present invention comprises the steps of: providing a pseudo frame buffer for said images to store source pixel values for display in the images; providing an image identifier for each source pixel value in the pseudo frame buffer, wherein the image identifier selects a colormap table corresponding to the image and the source pixel value selects a color value within the selected colormap table; and for each source pixel value in the pseudo frame buffer, performing steps including: (1) determining the image identifier corresponding to the source pixel value, (2) selecting a colormap table corresponding to the image identifier, (3) using the source pixel value to select a color value from the selected colormap table, and (4) storing the selected color value as a pixel value in the primary frame buffer for display.

In another aspect the present invention provides a subsystem for displaying color values for different images on a display device in a graphics system, wherein the graphics system includes a primary frame buffer for pixel values to be displayed in said images, and a plurality of colormap tables corresponding to the images for providing color values to be displayed in said images. The subsystem comprises: (a) a pseudo frame buffer for applications to store source pixel values for display in corresponding images, wherein each source pixel value includes an index to a color value in colormap table; and (b) a controller for colormapping each source pixel value in the pseudo frame buffer, including: (1) means for identifying the image corresponding to the source pixel value, (2) a colormap selector for selecting a colormap table corresponding to the identified image, (3) a color selector for selecting a color value from the selected colormap table using the source pixel value, and storing the selected color value as a pixel value in the primary frame buffer to be displayed.

In another embodiment, the subsystem comprises: (a) a pseudo frame buffer for said applications to store source pixel values for display in said corresponding images; (b) means for providing an image identifier for each source pixel value in the pseudo frame buffer, wherein the image identifier selects a colormap table corresponding to the image and the source pixel value selects a color value within the selected colormap table; and (c) a controller for colormapping each source pixel value in the pseudo frame buffer, including: (1) means for determining the image identifier corresponding to the source pixel value, (2) a colormap selector for selecting a colormap table corresponding to the image identifier, (3) a color selector for selecting a color value from the selected colormap table using the source pixel value, and storing the selected color value as a pixel value in the primary frame buffer for display.

As such, according to the present invention, the pixel values to be displayed in an image are first mapped to a colormap table corresponding to the image and then displayed on the display device. Therefore, two or more images on the display device can utilize two or more different colormap tables for displaying color values in each image, whereby flashing is eliminated. Indeed, there is no apriori limit on the number of different colormaps whose mapped images are displayable simultaneously without flashing. The present invention further provides support for applications using different color-mapping schemes. For example, the present invention provides support for an 8-bit colormapped applications in a 24-bit graphics system by mapping the pixel values generated by the 8-bit application to the proper colormap table for the image before display.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for providing colormaps. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
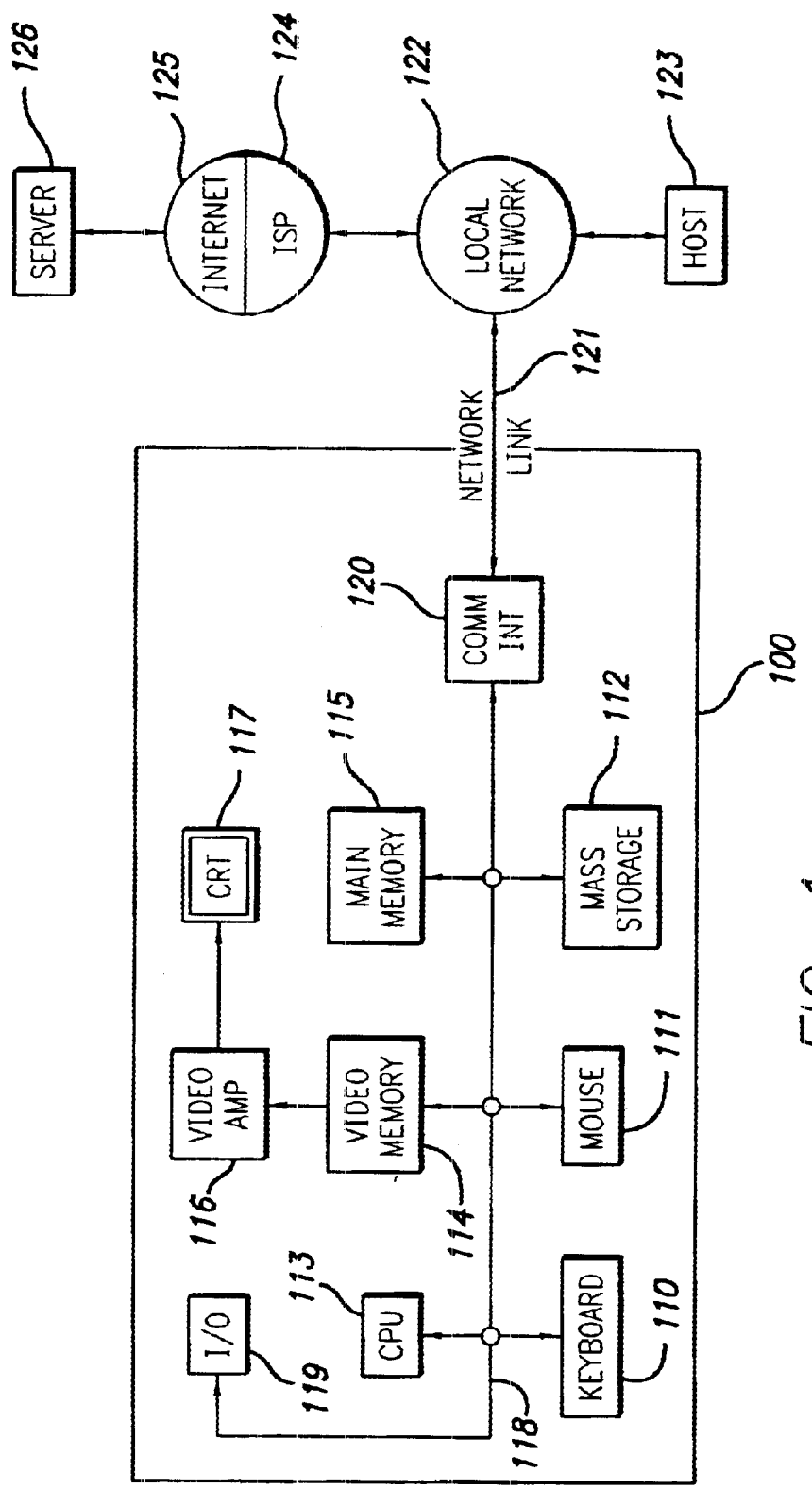
FIG. 1 shows an example block diagram of the architecture of an embodiment of a computer system in which the present invention can be implemented.

An embodiment of the invention can be implemented as computer software in the form of computer readable code executed on a general purpose computer such as computer 100 illustrated in FIG. 1, or in the form of bytecode class files executable within a Java™ runtime environment running on such a computer, or in the form of bytecodes running on a processor (or devices enabled to process bytecodes) existing in a distributed environment (e.g., one or more processors on a network). An optional keyboard 110 and mouse 111 are indirectly coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, all coupled to system bus 118 along with keyboard 110, mouse 111 and processor 113. The optional mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC™ microprocessor, or a microprocessor manufactured by Motorola, such as the 680×0 processor, or a microprocessor manufactured by Intel, such as the 80×86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Graphics System

Figure 2:
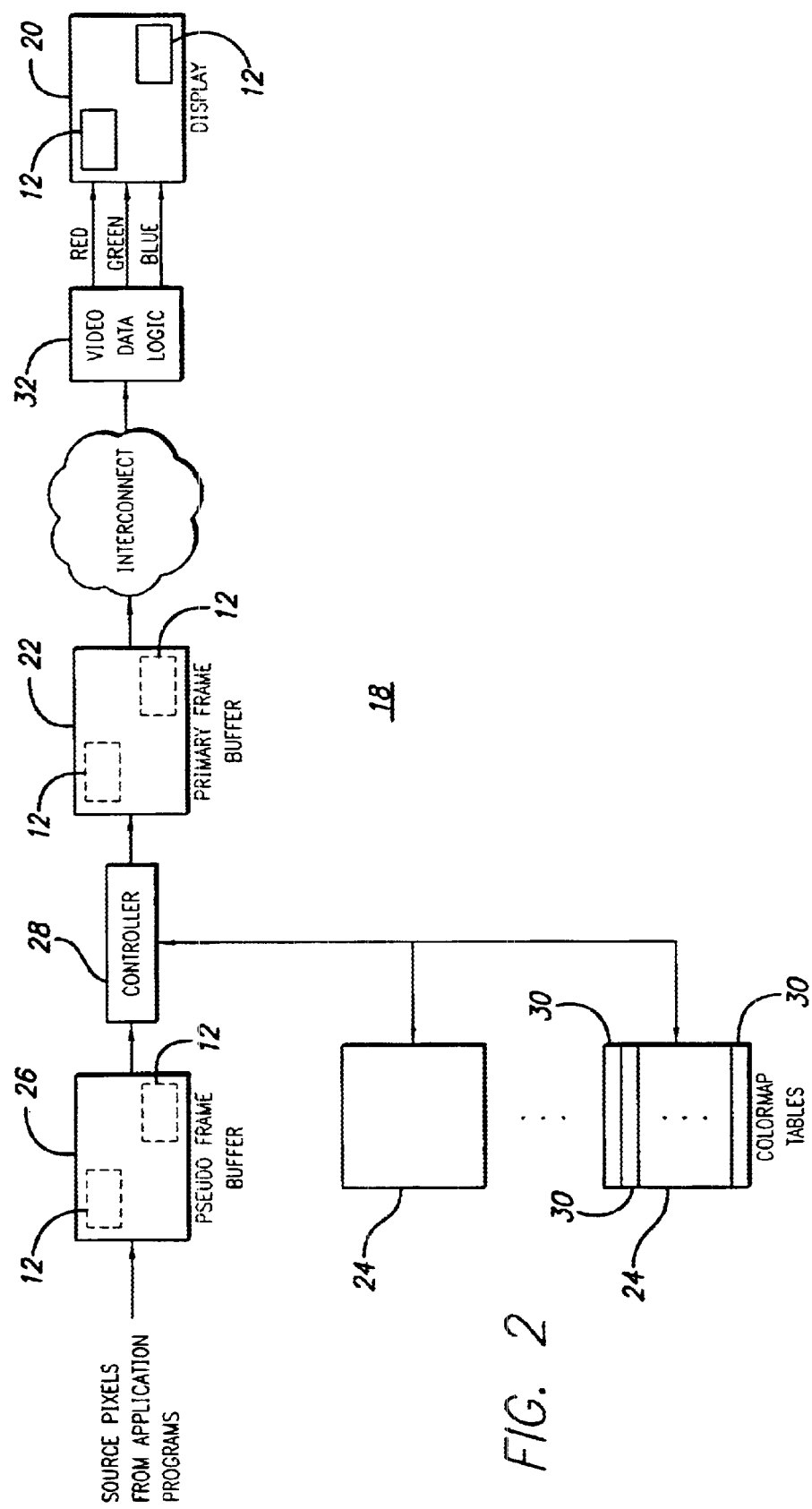
FIG. 2 shows an example block diagram of the architecture of an embodiment of the graphics system of FIG. 1 according to the present invention.

FIG. 2 shows an example block diagram of the architecture of an embodiment of a graphics system for use, for example, with the computer system of FIG. 1 according to the present invention. The graphics system 18 comprises: (1) a primary frame buffer 22 for providing pixel values through an optional interconnect fabric to video data logic 32 to be displayed in the windows 12, (2) a plurality of colormap tables 24 corresponding to the plurality of windows 12 for providing color values to be displayed in said windows 12 (note that there can be a one to one, or one to many relationship between images and colormaps. In other words, one colormap may be used for multiple windows or images), (3) a pseudo frame buffer 26 for the applications to store source pixel values for display in the corresponding windows 12, wherein each source pixel value includes an index to a color value 30 in a colormap table 24, and (4) a controller 28 for mapping a color value 30 from a selected colormap table 24 to each source pixel value, and storing the color value as a pixel value in the primary buffer 22 to be displayed in a corresponding window 12 on the display device 20.

Figure 3:
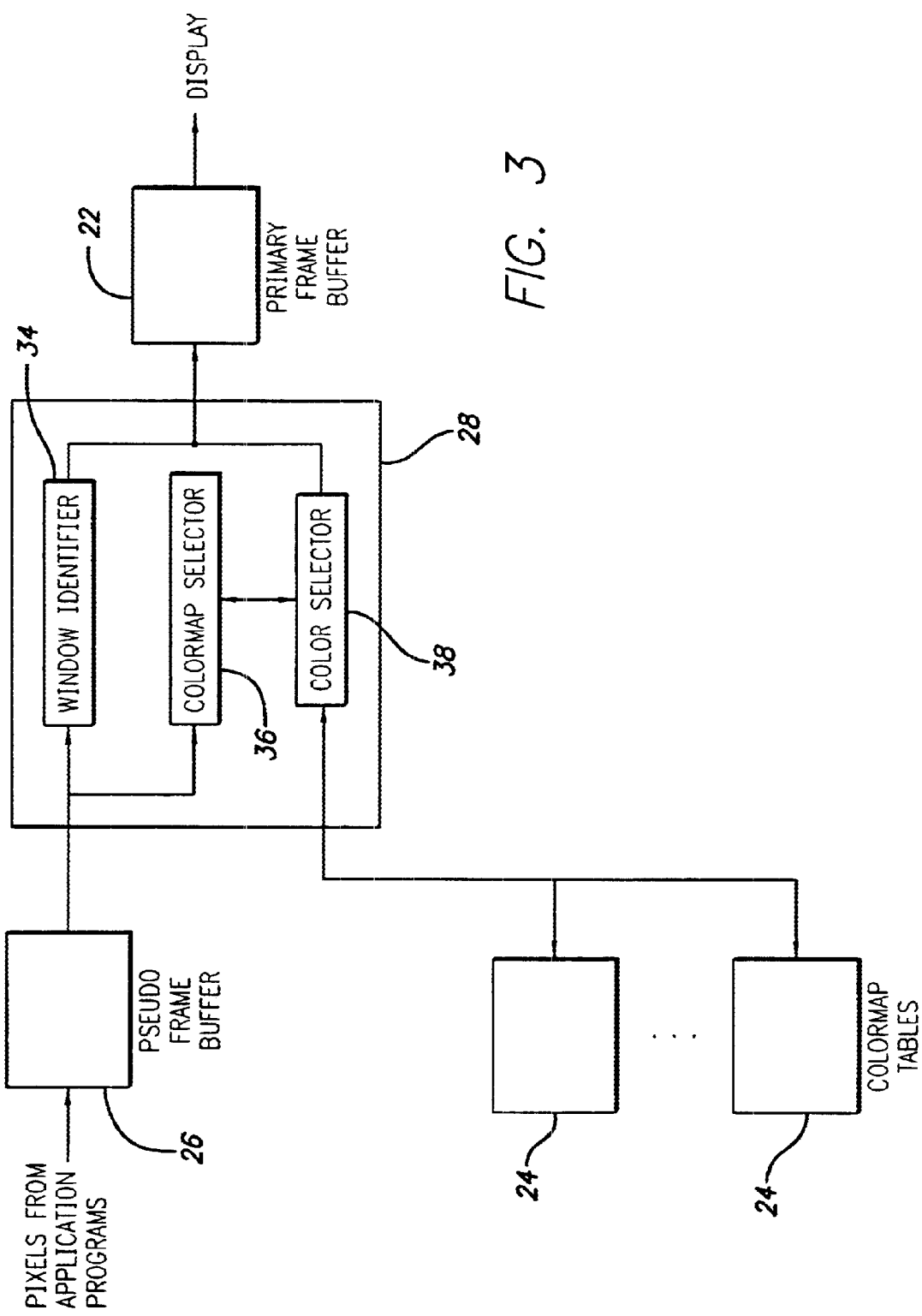
FIG. 3 shows as an example block diagram of the architecture of the controller of FIG. 2.

Referring to FIG. 3, in an example embodiment, the controller 28 comprises: (1) identification means 34 for identifying the window corresponding to each source pixel value, (2) a colormap selector 36 for selecting a colormap table 24 corresponding to the identified window, and (3) a color selector 38 for selecting a color value from the selected colormap table 24 using the source pixel value and storing the selected color value as a pixel value in the primary frame buffer 22 to be displayed.

The present invention has application where the different images of a single application have separate colormaps as well as where separate applications have colormaps associated with windows of each application. The following description relates to where different windows are each associated with an application and each have their own colormaps, In operation, each application program generates source pixel values for display in a corresponding window 12 on the display screen 20. Each window 12 is related to a colormap table 24 by the corresponding application program or by the operating system. Each application program generates source pixel values based on the colormap table 24 for the corresponding window 12. As such, each source pixel value represents an index to the corresponding colormap table 24 for looking up a color value 30 therein. The source pixel values from each application program are stored in the frame buffer 26 (in one embodiment a pseudo frame buffer) and for each source pixel value the identification means 34 identifies the corresponding window 12 in which the pixel value is to be displayed. The means 34 can compare the location of the source pixel value in the pseudo frame buffer 26 relative to the display screen to determine the corresponding window 12. Alternatively, each source pixel value can have a window number or a memory address pointer to specifically identify the corresponding window 12.

The colormap selector 36 then selects a colormap table 24 corresponding to the identified window 12. The colormap selector 36 can utilize the window number or identification to form an index or address to a corresponding colormap table 24 in memory for example. The color selector 38 uses the source pixel value as an index into the selected colormap table 24 to select a color value 30 therein. The selected color value for the source pixel value is then stored in the primary frame buffer 22 for display on the display device 20.

Each color value can be a combination of a red color value, a green color value and a blue color value. The color values in the primary frame buffer 22 can be displayed on a computer display monitor using a video data logic circuit 32 including a digital to analog converter for converting digital color values to analog red, green and blue values for display on the display monitor.

Each window 12 can have its own unique corresponding colormap table 24 for displaying color on the display device 20. Alternatively, two or more windows 12 can use the same colormap table 24 for displaying colors on the display device 20. As such, according to the present invention, the pixel values to be displayed in a window 12 are first mapped to a colormap table 24 corresponding to the window 12 and then displayed on the display device 20. Therefore, two or more windows 12 on the display device 20 can utilize two or more different colormap tables 24 for displaying color values in each window 12, whereby flashing is eliminated.

Further, application programs using different color-mapping techniques can be supported by the present invention. For example, one of the application programs can utilize 8-bit color-mapping using a colormap table 24 with 256 color values, while another application program can utilize 4-bit color-mapping using a corresponding colormap table 24. The 8-bit application stores source pixel values in the pseudo frame buffer 26 which index into an 8-bit colormap table 24 for displaying color in a corresponding window 12. Similarly, the 4-bit application stores source pixel values in the pseudo frame buffer 26 which index into a 4-bit colormap table 24 for displaying color in a corresponding window 12.

The controller 28 processes the source pixels from the 8-bit application by identifying the corresponding window 12 and selecting the 8-bit colormap table 24 for the identified window 12. The controller 28 then uses the source pixels from the 8-bit application to index into selected the 8-bit colormap table 24 to lookup the color value 30 for the source pixel value. The translated color value is then stored in the primary buffer 22 to be displayed on the display device 20. Similarly, the controller 28 process the source pixels from the 4-bit application by identifying the corresponding window 12 and selecting the 4-bit colormap table 24 for the identified window 12. The controller 28 then uses the source pixels from the 4-bit application to index into the selected 4-bit colormap table 24 to lookup the color value for the source pixel value. The looked-up color value is then stored in the primary buffer 22 to be displayed on the display device 20. As such, both applications are properly supported by the present invention.

To identify a corresponding window 12 for each source pixel value, the computer system can provide a window identifier, such as window number or memory address pointer, for each source pixel value in the pseudo frame buffer 26, wherein the window identifier selects a colormap table 24 corresponding to the window 12 and the source pixel value selects a color value 30 within the selected colormap table 24. As such, for each source pixel value, the identification means 34 determines the window identifier corresponding to the source pixel value, and the colormap selector 36 selects a colormap table 24 corresponding to the window identifier. The color selector 38 then selects a color value 30 from the selected colormap table 24 using the source pixel value as an index, and stores the selected color value 30 as a pixel value in the primary frame buffer 22 to be displayed.

Figure 4:
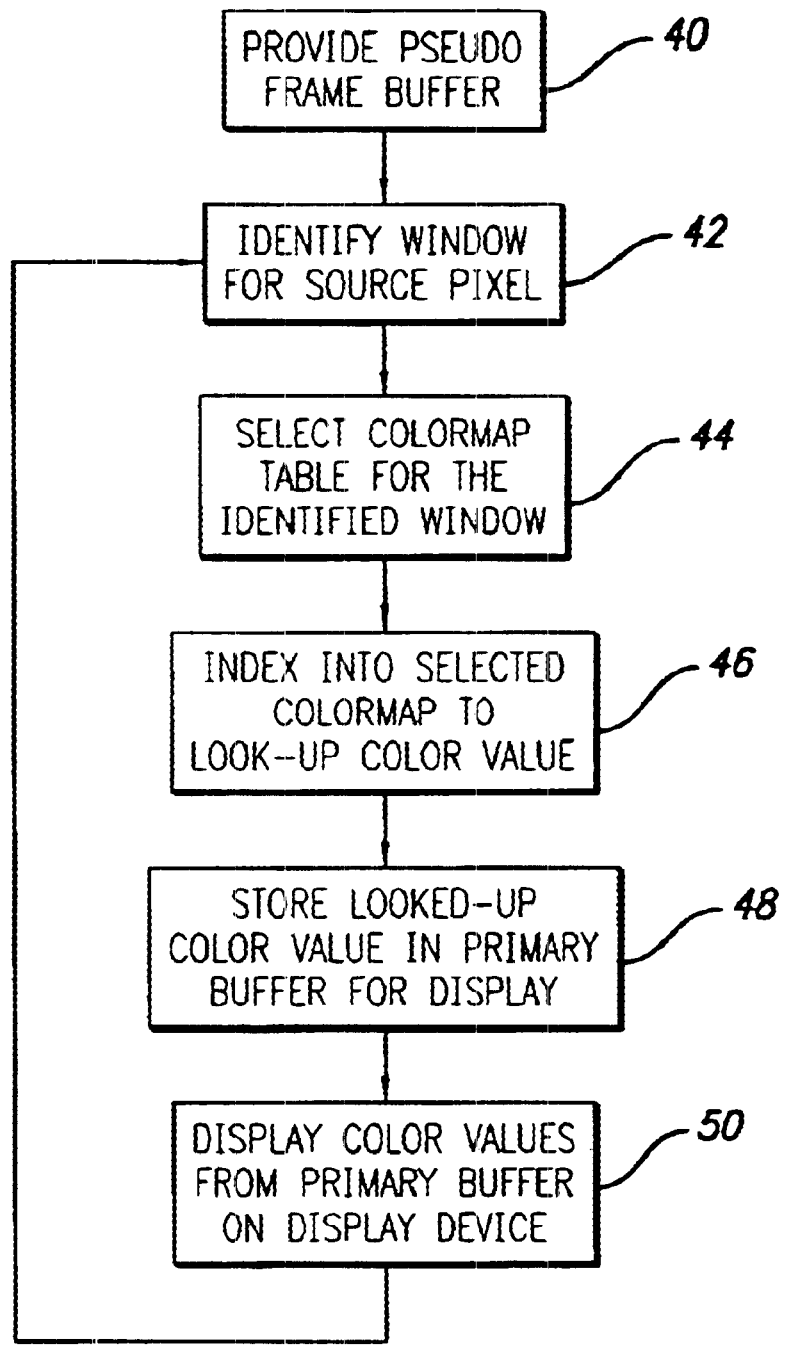
FIG. 4 shows an example flowchart of an embodiment of a method of displaying color values in different windows according to the present invention.

Referring to FIG. 4, in another aspect the present invention provides a method displaying color values in said windows, comprising the steps of: providing a pseudo frame buffer for said applications to store source pixel values for display in the windows (step 40); and for each source pixel value in the pseudo frame buffer, performing steps including: identifying the corresponding window (step 42); selecting a colormap table corresponding to the identified window (step 44); using the source pixel value to select a color value from the selected colormap table (step 46); and storing the selected color value as a pixel value in the primary frame buffer to be displayed (step 48). The color values in the primary frame buffer are then displayed on the display device (step 50).

Figure 5:
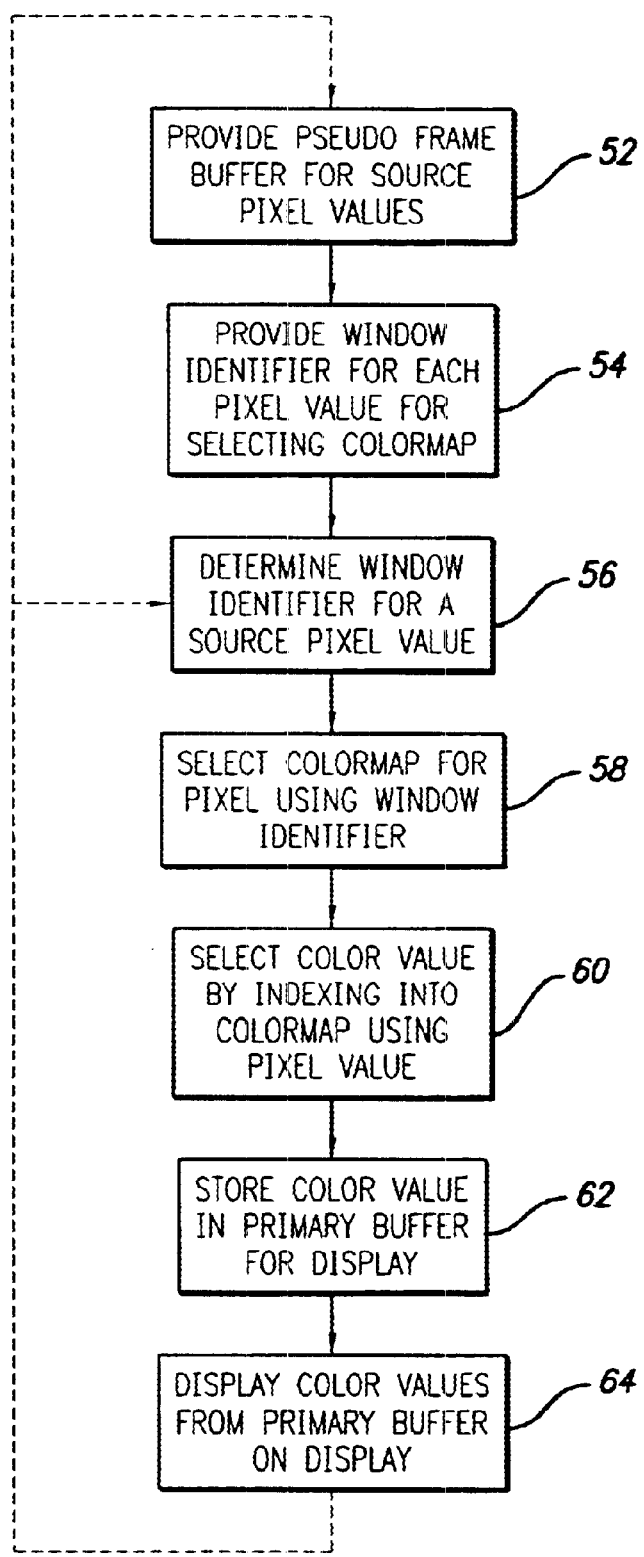
FIG. 5 shows an example flowchart of another embodiment a method of displaying color values in different windows according to the present invention.

Referring to FIG. 5, in another embodiment, a pseudo frame buffer for said applications to store source pixel values for display in corresponding windows (step 52). At step 54, a window identifier is provided for each source pixel value in the pseudo frame buffer, the window identifier selects a colormap table corresponding to the window and the source pixel value selects a color value within the selected colormap table. For each source pixel value in the pseudo frame buffer, the system determines the window identifier corresponding to the source pixel value (step 56), selects a colormap table corresponding to the window identifier (step 58) and uses the source pixel value to select a color value from the selected colormap table (step 60) and stores the selected color value as a pixel value in the primary frame buffer to be displayed (step 62). The color values in the primary frame buffer are then displayed on the display device (step 64).

As such, in one aspect, the present invention provides a colormapping technique using program instructions for properly displaying pixel color values in different windows using different color-mapping techniques and different color-mapping tables. Said program instructions can be used to configure a conventional graphics system in which normally only one colormap table is loaded into the colormap hardware of the computer system, and as a result the computer system suffers from color flash and lack of support for different applications using different color-mapping techniques. Instead of loading different colormap tables into the colormap hardware for providing color in corresponding windows, such a conventional computer system can be configured by program instructions according to the present invention whereby the pixel values to be displayed in each window are first mapped to a colormap table corresponding to the window and then displayed on the display device.

Therefore, two or more windows on the display device can utilize two or more different colormap tables for displaying color values in each window, and flashing is eliminated. So configured, such a computer system can also support application programs using different color-mapping schemes, such as for example, properly running an 8-bit color-mapped application in a conventional 24-bit graphics computer system by mapping the pixel values generated by the 8-bit application to the proper colormap table for the application window before display. There is therefore no need for an 8-bit colormap hardware.

For example, in a 24-bit graphics computer system configured by program instructions according to the present invention, source pixel values written into the pseudo frame buffer 26 by an 8-bit color-mapped application are processed on-the-fly by translating the source pixel data into the primary 24-bit primary frame buffer for display utilizing the actual desired colormap table 24 of the window corresponding to the 8-bit application as described above. Every time a source pixel value is written into the pseudo frame buffer 26, or the display area corresponding to the source pixel value must be refreshed, the source pixel value is mapped to the proper color value using the above steps and stored in the primary frame buffer 22 for display. Therefore, the configured graphics computer system eliminates color flash and supports applications using different color-mapping schemes (e.g., 8-bit) than the native color-mapping or display scheme (e.g., 24-bit) of the computer system, with minimal loss in system performance.

Virtual Desktop System Architecture

Another environment in which the present invention may be applied is in a virtual desktop system. One example of such a computer system is described in U.S. patent application Ser. No. 09/063,335 filed Apr. 20,1998 and entitled "Method and Apparatus for Providing a Virtual Desktop System Architecture". In such a system, there are provided a central office metaphor to computing, where features and functions are provided by one or more servers and communicated to an appliance terminal through a network. Data providers are defined as "services" and are provided by one or more processing resources. The services communicate to display terminals through a network, such as Ethernet. The terminals are configured to display data, and to send keyboard, cursor, audio, and video data through the network to the processing server. Functionality is partitioned so that databases, server and graphical user interface functions are provided by the services, and human interface functionality is provided by the terminal. Communication with the terminals from various services is accomplished by converting disparate output to a common protocol. Appropriate drivers are provided for each service to allow protocol conversion. Multiple terminals are coupled to the network. Users can enable their unique session at any one of the terminals by logging in such as by inserting a "smart card" into a card reader. Removing the card disables the session. Re-inserting the card into the same or any other terminal re-enables the session.

Figure 6:
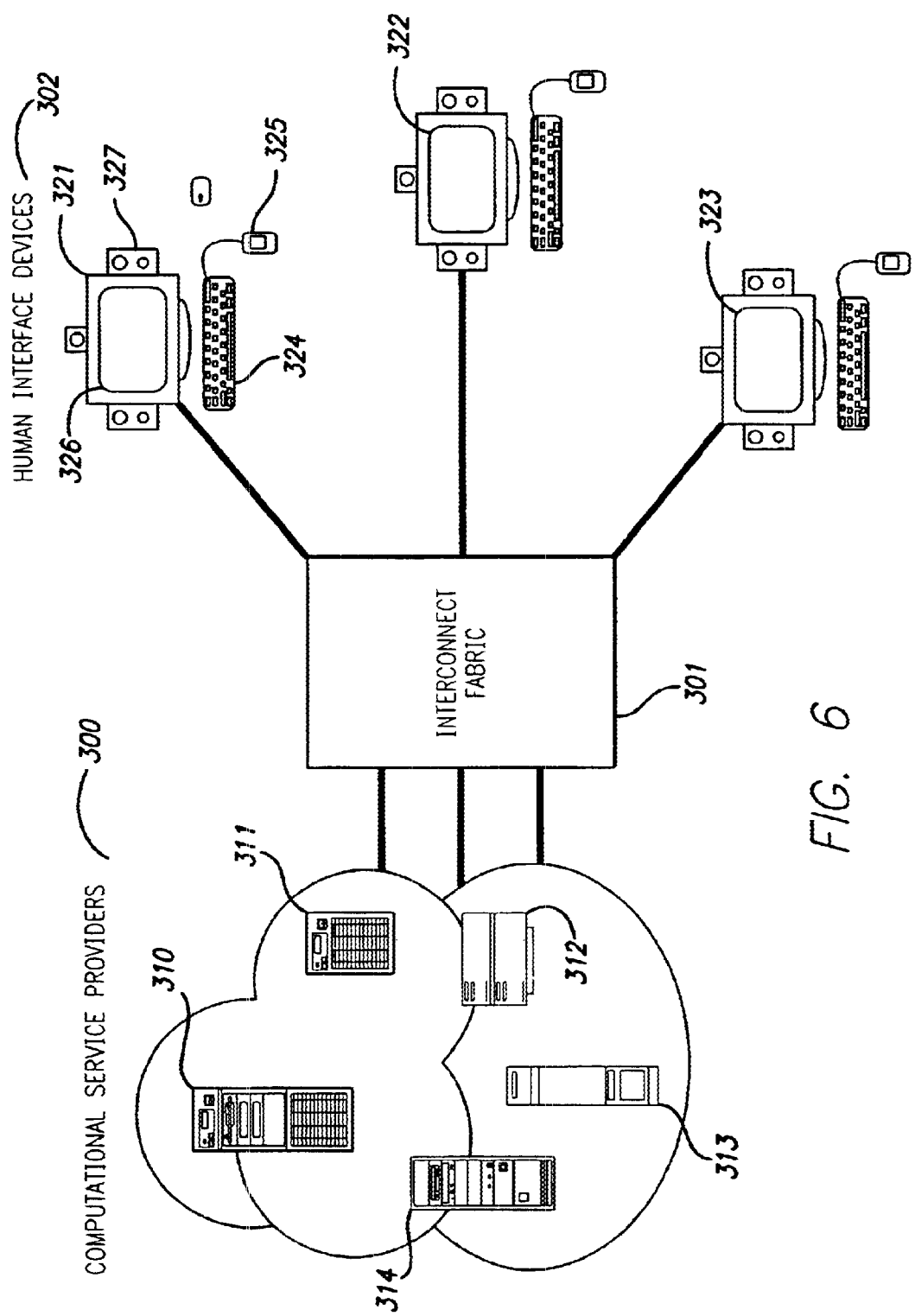
FIG. 6 illustrates the virtual desktop environment of the present invention.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 6. Referring to FIG. 6, the system consists of computational service providers 300 communicating data through interconnect fabric 301 to HIDs 302.

Computational Service Providers

In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 6, the services are found on computers 310, 311, 312, 313, and 314. It is important to note that the central data source can also be providing data that comes from outside of the central data source, such as for example, the internet or world wide web. The data source could also be broadcast entities such as those that broadcast data such as television or radio signals.

Examples of services include X11/Unix services, archived or live audio or video services, Windows NT service, Java™ program execution service, and others. A service herein is a process that provides output data and responds to user requests and input.

It is the responsibility of the service to handle communications with the HID that is currently being used to access the given service. This involves taking the output from the computational service and converting it to a standard protocol for the HID. This data protocol conversion is handled in one embodiment of the invention by a middleware layer, such as the X11 server, the Microsoft Windows interface, a video format transcoder, the OpenGL interface, or a variant of the java.awt.graphics class) within the service producer machine. The service machine handles the translation to and from the virtual desktop architecture wire protocol.

In an embodiment of the invention, each service is provided by a computing device optimized for its performance. For example, an Enterprise class machine could be used to provide X11/Unix service, a Sun MediaCenter could be used to provide video service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

Human Interface Devices

The HID is the means by which users access the computational services provided by the services. The HID may also be referred to as a client or user workstation or terminal. FIG. 6 illustrates HIDs 321, 322, and 323. A HID consists of a display 326, an optional keyboard 324, optional mouse 325, and audio speakers 327. The HID includes the electronics need to interface these devices to the interconnection fabric and to transmit to and receive data from the services.

Figure 7:
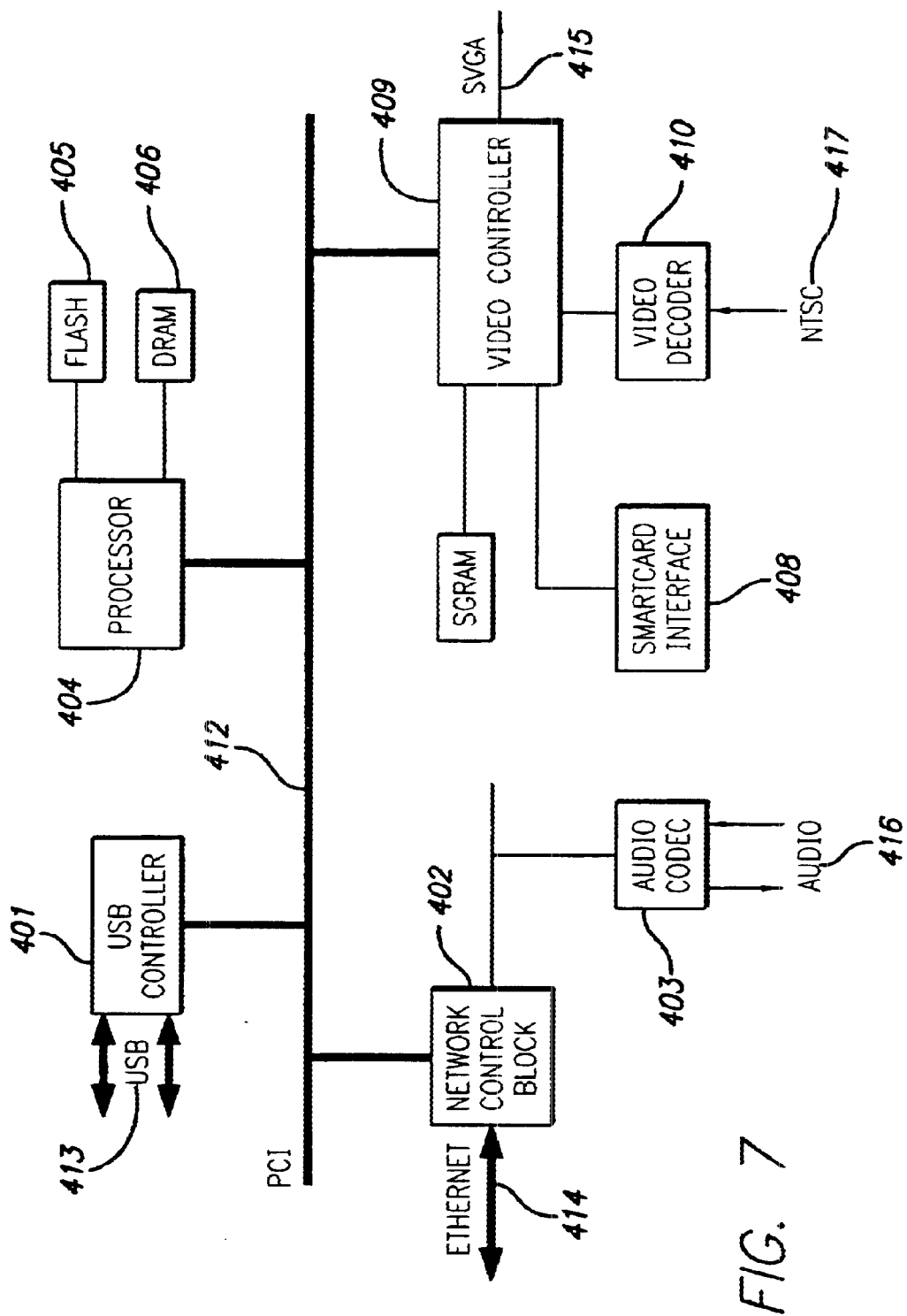
FIG. 7 is a block diagram of one embodiment of an HID of the present invention.

A block diagram of the HID is illustrated in FIG. 7. The components of the HID are coupled internally to a PCI bus 412. A network control block 402 communicates to the interconnect fabric, such as an ethernet, through line 414. An audio codec 403 receives audio data on interface 416 and is coupled to block 402. USB data communication is provided on lines 413 to USB controller 401.

An embedded processor 404 may be, for example, a Sparc2ep with coupled flash memory 405 and DRAM 406. The USB controller 401, network controller 402 and embedded processor 404 are all coupled to the PCI bus 412. Also coupled to the PCI 412 is the video controller 409. The video controller 409 may be for example, an ATI Rage128 frame buffer controller (or any other suitable controller) that provides SVGA output on line 415. NTSC 417 or PAL data is provided into the video controller through video decoder 410. A smartcard interface 408 may also be coupled to the video controller 409.

Figure 8:
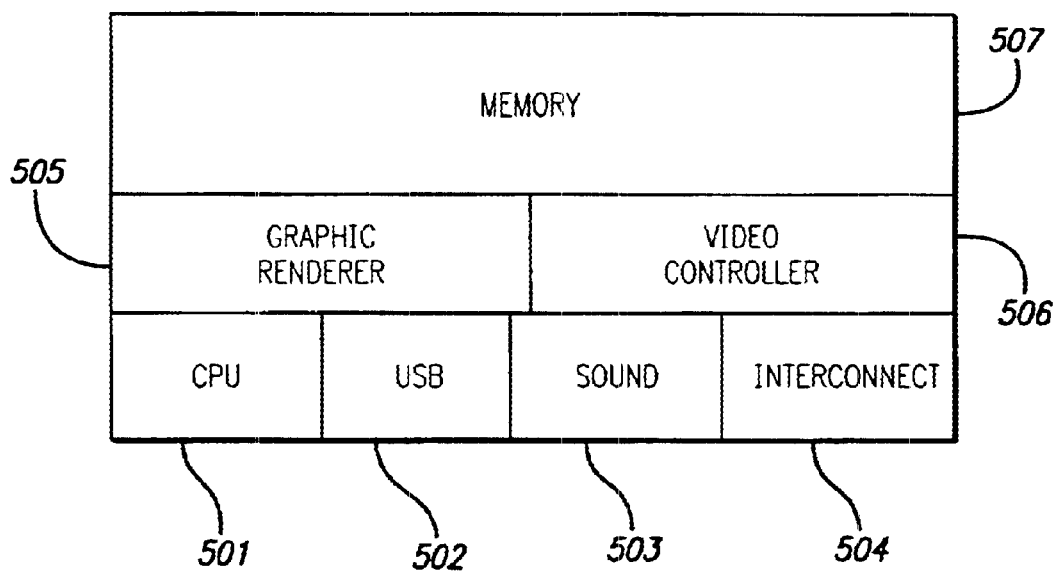
FIG. 8 illustrates a single chip HID embodiment of the present invention.

Alternatively, the HID can be implemented using a single chip solution as illustrated in FIG. 8. The single chip solution includes the necessary processing capability implemented via CPU 501 and graphics renderer 505. Chip memory 507 is provided, along with video controller/interface 506. A universal serial bus (USB) controller 502 is provided to permit communication to a mouse, keyboard and other local devices attached to the HID. A sound controller 503 and interconnect interface 504 are also provided. The video interface shares memory 507 with the CPU 501 and graphics renderer 505. The software used in this embodiment may reside locally in non volatile memory or it can be loaded through the interconnection interface when the device is powered.

In a system constructed as in the virtual desktop architecture, the primary frame buffer referred to in the present invention may not be a hardware frame buffer attached directly to display hardware, but may itself be a pseudo frame buffer implemented in software and used to provide source data to an HID display over an interconnect.

Although the present invention has been described in considerable detail with regard to the preferred versions thereof, other versions are possible. Therefore, the appended claims should not be limited to the descriptions of the preferred versions contained herein.

What is claimed is:

1. A computer graphics system for displaying a plurality of images, the graphics system comprising:
   a primary frame buffer for storing pixel values to be displayed in the plurality of images;
   a plurality of colormap tables corresponding to the images, the plurality of colormap tables providing color values to be displayed in the images; and
   a subsystem for displaying color values for the plurality of images, the subsystem comprising:
   (a) a frame buffer to store source pixel values for display in the plurality of images; and
   (b) a controller for colormapping each source pixel value in the frame buffer, the controller including:
      (1) an identifier for identifying an image of the plurality of images corresponding to the source pixel value,
      (2) a colormap selector for selecting a colormap table from the plurality of colormap tables, the selected colormap table corresponding to the identified image, and
      (3) a color selector for selecting a color value from the selected colormap table using the source pixel value and for storing the selected color value as a pixel value in the primary frame buffer to be displayed;
   wherein the stored pixel value stored in the primary frame buffer is displayed on a display without additional colormapping.

2. The computer graphics system of claim 1, further comprising a server, a network, and a thin client coupled with the server via the network.

3. The computer graphics system of claim 2, wherein the subsystem further comprises a display for displaying the pixel values from the primary frame buffer, wherein the display is coupled with the primary frame buffer via the network, wherein the display is physically located within the thin client and wherein the primary frame buffer is physically located within the server.

4. The computer graphics system of claim 1, wherein the plurality of colormap tables are not implemented with a hardwired colormap table.

5. The computer graphics system of claim 1, wherein each of the plurality of colormap tables is configured independently.

6. The computer graphics system of claim 1, wherein each of the plurality of colormap tables does not comprise a portion of any hardwired colormap table associated with the computer graphics system.

7. The computer graphics system of claim 1, wherein a software is configured to provide the frame buffer, the controller, and the plurality of colormap tables.

8. The computer graphics system of claim 7, wherein the selected color value is stored in the frame buffer before being stored as the stored pixel value in the primary frame buffer to be displayed.

9. The computer graphics system of claim 8, wherein the primary frame buffer is a hardwired frame buffer.

10. The computer graphics system of claim 1, wherein the primary frame buffer is compatible for displaying images associated with a first-type of color-mapped image, wherein the plurality of images comprise a second-type of color-mapped image, and wherein the stored pixel value in the primary frame buffer is displayed on the display without any additional translation.

11. The computer graphics system of claim 10, wherein the second-type of color-mapped image is an 8-bit color-mapped image.

12. The computer graphics system of claim 10, wherein each of the plurality of images utilizes a corresponding unique type of colormap table.

13. The computer graphics system of claim 1, wherein the primary frame buffer is compatible with a first-type of colormap table, wherein at least one of the plurality of images utilizes a second-type of colormap table, and wherein the pixel value stored in the primary frame buffer is displayed on the display without any additional translation.

14. The computer graphics system of claim 13, wherein the second-type of colormap table is an 8-bit colormap table.

15. The computer graphics system of claim 1, wherein the primary frame buffer comprises a pseudo frame buffer.

16. The computer graphics system of claim 15, wherein the pseudo frame buffer is used to provide source data to a Human Interface Device (HID) display through an interconnect.

17. The computer graphics system of claim 1, wherein the plurality of colormap tables utilized by the graphics system can have a colormap table size that is larger than any physical colormap table size associated with the graphics system.

18. The computer graphics system of claim 1, wherein the plurality of colormap tables utilized by the graphics system can have an address bus limit that is larger than an address bus limit of any physical colormap table associated with the graphics system.

19. The computer graphics system of claim 1, wherein the plurality of colormap tables utilized by the graphics system can have a data bus limit that is larger than a data bus limit of any physical colormap table associated with the graphics system.

20. The computer graphics system of claim 1, wherein the plurality of colormap tables utilized by the graphics system can have address and data bus width limits that are larger than address and data bus width limits of any physical colormap table associated with the graphics system.

21. The computer graphics system of claim 1, wherein the plurality of colormap tables utilized by the graphics system are not confined by a physical limitation of any physical colormap table associated with the graphics system.

22. The computer graphics system of claim 21, wherein the physical limitation comprises an address bus limit.

23. The computer graphics system of claim 21, wherein the physical limitation comprises a data bus limit.

24. The computer graphics system of claim 21, wherein the physical limitation comprises address and data bus width limits.

25. The subsystem of claim 1, wherein the selected color value comprises a color intensity value.

26. The subsystem of claim 25, wherein the color intensity value includes a combination of red color, green color and blue color values.

27. In a computer graphics system for displaying a plurality of different images on a display screen, the graphics system comprising a primary frame buffer for storing pixel values to be displayed in the plurality of different images and a plurality of colormap tables corresponding to the different images for providing color values to be displayed in the different images, a method for displaying color values for the different images, the method comprising the steps-of:

(a) storing in a frame buffer source pixel values for display in the images, wherein each source pixel value selects a color value within a colormap table; and (b) for each source pixel value in the frame buffer, performing steps including:

(1) identifying an image of the plurality of different images corresponding to the source pixel value, (2) selecting a colormap table corresponding to the identified image, (3) using the source pixel value to select a color value from the selected colormap table, (4) storing the selected color value in the frame buffer, and (5) storing the selected color value as a pixel value in the primary frame buffer to be displayed;

wherein the plurality of colormap tables are not implemented into a hardwired colormap table.

28. A computer graphics system comprising:

a source pixel value for display of an image on a display screen, wherein the source pixel values are only compatible with a first-type of colormap table for providing color intensity values;

a hardwired primary frame buffer for storing pixel values to be displayed on the display screen, wherein the primary-frame buffer is only compatible with a second-type of colormap table for providing color intensity values; and a software configured to provide:

(a) a plurality of colormap tables having the first-type of colormap table;

(b) a translation mechanism comprising:

(1) an identifier for identifying the image corresponding with the source pixel value;

(2) a colormap selector for selecting the first-type of colormap table from the plurality of colormap tables, and (3) a color selector for selecting a color intensity value from the first-type of colormap table using the source pixel value and for storing the selected color intensity value as a pixel value in the hardwired primary frame buffer to be displayed;

wherein the stored pixel value in the hardwired primary frame buffer is displayed on the display screen without additional translation.

29. The computer graphics system of claim 28, wherein the software is further configured to proved a software frame buffer and wherein the selected color value is stored in the software frame buffer before being stored as the stored pixel value in the hardwired primary frame buffer.

30. The computer graphics system of claim 28, wherein the first-type of colormap table is an 8-bit colormap table.

31. The computer graphics system of claim 30, wherein the second-type of colormap table is a 24-bit colormap table.

32. The computer graphics system of claim 28, further comprising a hardwired colormap table coupled with the hardwired primary frame buffer and wherein the plurality of colormap tables operate independently from the hardwired colormap table.

33. The computer graphics system of claim 28, wherein each of the plurality of colormap tables does not comprise a portion of any hardwired colormap table.

34. A computer graphics system for displaying source pixel values in one or more images on a display device, comprising:

a primary frame buffer for storing pixel values to be displayed in the images;

one or more colormap tables corresponding to the images and providing color intensity values to be displayed in the images;

a frame buffer for storing the source pixel values to be displayed in the images;

an image identifier for each source pixel value in the frame buffer, wherein the image identifier selects a colormap table corresponding to a specific image and the source pixel value selects a color intensity value within the selected colormap table; and a controller for colormapping each source pixel value in the frame buffer, the controller including:

(1) an identifier for determining the image identifier corresponding to the source pixel value, (2) a colormap selector for selecting a colormap table corresponding to the image identifier, and (3) a color selector for selecting a color value from the selected colormap table using the source pixel value and for storing the selected color value as a pixel value in the primary frame buffer to be displayed;

wherein the one or more colormap tables do not comprise a portion of any hardwired colormap table.

* * * * *